(12) United States Patent
Echeverri et al.

(10) Patent No.: US 11,656,519 B2
(45) Date of Patent: May 23, 2023

(54) LIQUID CRYSTAL DEVICE THAT IS ERASED BY FLEXING

(71) Applicant: Kent Displays, Inc., Kent, OH (US)

(72) Inventors: Mauricio Echeverri, Kent, OH (US); Clinton Braganza, Kent, OH (US); Anthony Daniels, Kent, OH (US)

(73) Assignee: Kent Displays, Inc., Kent, OH (US)

( * ) Notice: Subject to any disclaimer, the term of this patent is extended or adjusted under 35 U.S.C. 154(b) by 61 days.

(21) Appl. No.: 17/321,866

(22) Filed: May 17, 2021

(65) Prior Publication Data

US 2022/0365385 A1 Nov. 17, 2022

(51) Int. Cl.
*G02F 1/137* (2006.01)
*G02F 1/1335* (2006.01)
*G02F 1/1334* (2006.01)

(52) U.S. Cl.
CPC ........ *G02F 1/13718* (2013.01); *G02F 1/1334* (2013.01); *G02F 1/133512* (2013.01); *G02F 2201/343* (2013.01)

(58) Field of Classification Search
CPC . G02F 1/13718; G02F 2201/343; G02F 1/178
See application file for complete search history.

(56) References Cited

U.S. PATENT DOCUMENTS

| 4,525,032 | A | * | 6/1985 | Hilsum | ............... | G02F 1/13306 |
|---|---|---|---|---|---|---|
| | | | | | | 349/122 |
| 6,104,448 | A | | 8/2000 | Doane et al. | | |
| 8,228,301 | B2 | | 7/2012 | Schneider | | |
| 11,409,175 | B1 | * | 8/2022 | Echeverri | ........... | G02F 1/13338 |
| 2009/0096942 | A1 | * | 4/2009 | Schneider | ........... | G02F 1/13338 |
| | | | | | | 349/12 |

* cited by examiner

*Primary Examiner* — Jessica M Merlin
(74) *Attorney, Agent, or Firm* — Serbinowski PLLC

(57) ABSTRACT

A liquid crystal device that is flexible and includes a cholesteric liquid crystal material erased by flexing. Totally free of electronics and electrically conductive electrodes, the liquid crystal device takes advantage of a reverse mode effect observed in cholesteric liquid crystals whereby pressure applied to the device changes a reflective texture to a transmissive texture to create an image. The image is erased and the device reinitialized by flexing to create reflective texture surroundings.

30 Claims, 5 Drawing Sheets

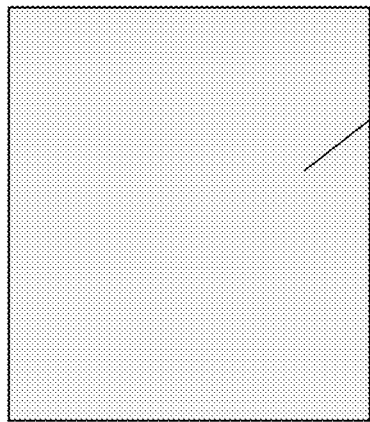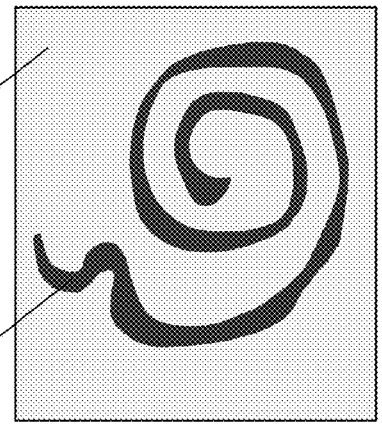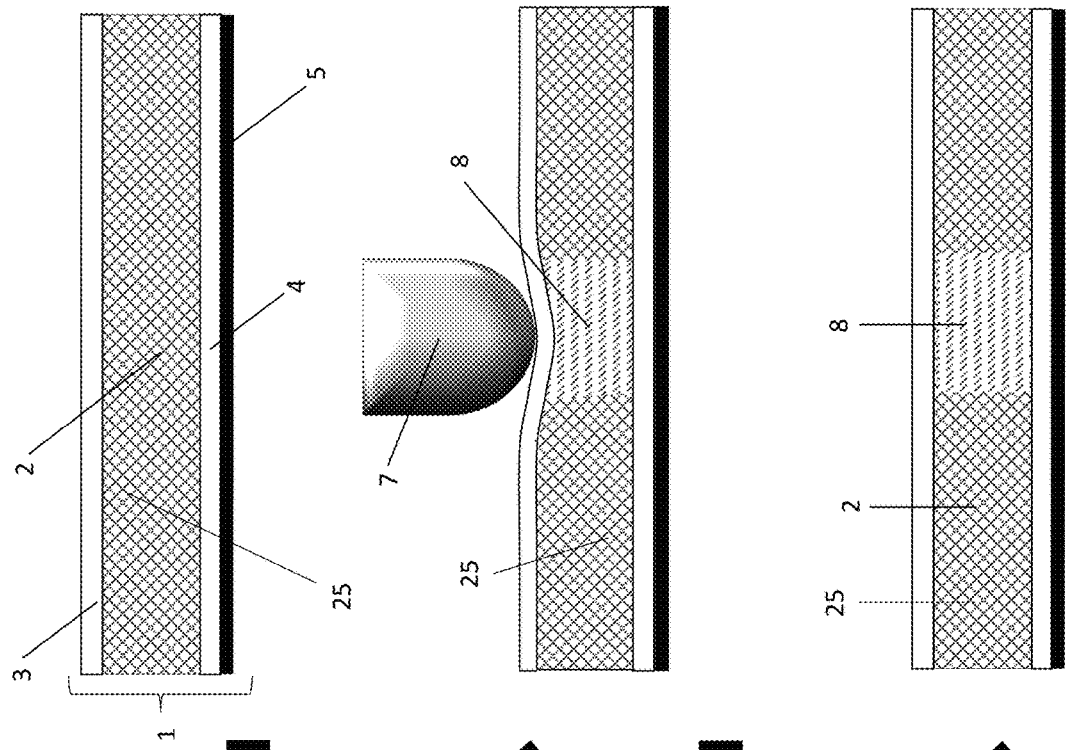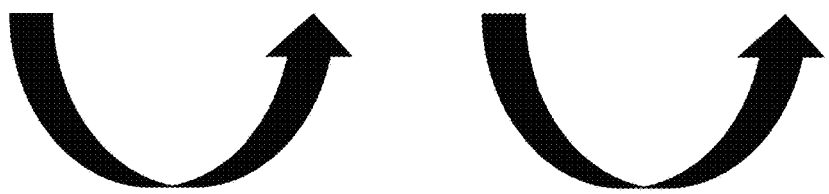
Figure 1
Figure 2
Figure 3

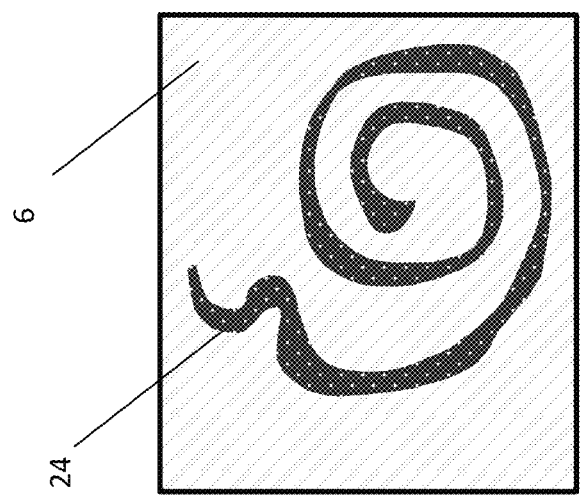
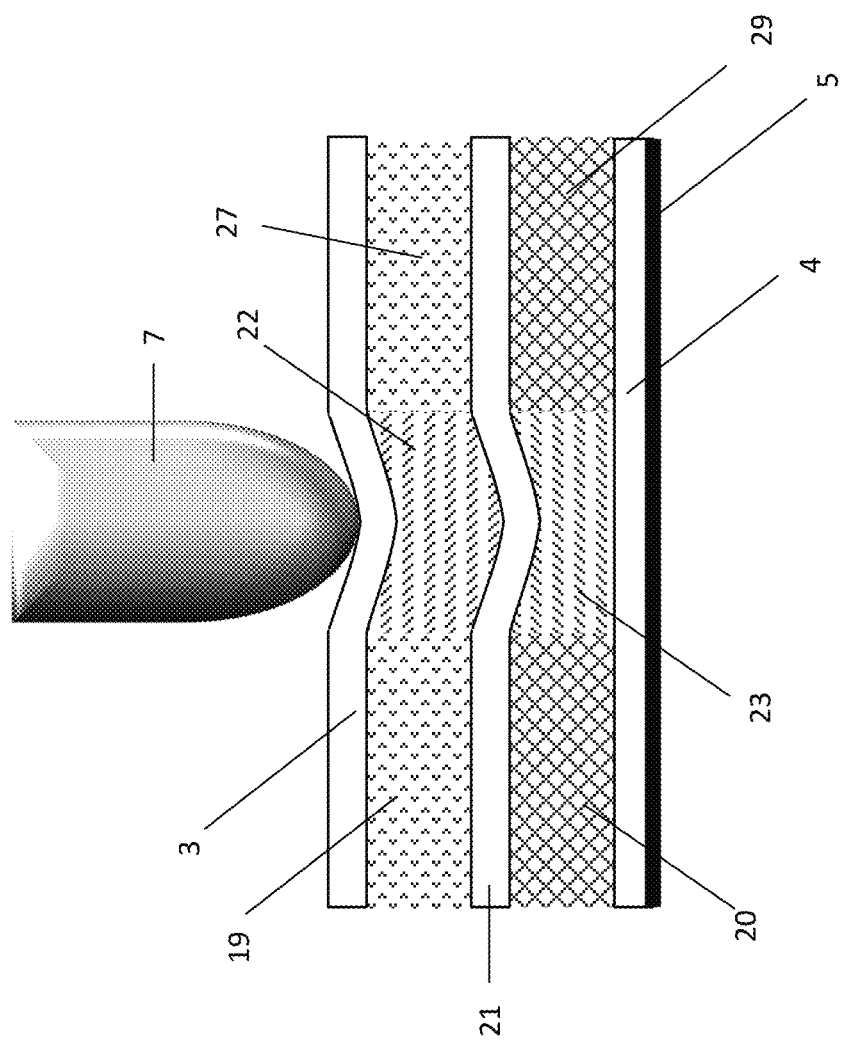
Figure 7B
Figure 7A

LIQUID CRYSTAL DEVICE THAT IS ERASED BY FLEXING

TECHNICAL FIELD

This disclosure relates generally to cholesteric liquid crystal pressure sensitive devices.

BACKGROUND

Many different complex digital devices with handwriting capabilities such as tablets, smart boards, and cell phones have become ubiquitous in professional settings and for use in daily life. Despite the proliferation of such devices, paper is still used extensively in activities that are not suitable for rigid and expensive glass based electronic devices. Other devices integrate digital tools such as smart pens that capture traditional pen and paper writing or sensors that detect and digitize the writing movements on a surface. Although these applications are convenient to record notes, they do not mimic the use and feel of writing with pen on paper. Boogie Board® writing tablets include a flexible polymer substrate writing surface and are based on cholesteric liquid crystal technology, giving them a performance and feel much closer to a pen on paper writing experience. Boogie Board® writing tablets are also thinner than conventional devices, light in weight and can be reused many thousands of times. Boogie Board® writing tablets do not use ink and can be combined with other digitizing tools such as touch screens or smart pens. Boogie Board® writing tablets, however, still depend on electronics to erase. Moreover, current commercial generations are rigid and thicker than paper, which can be a disadvantage for some applications.

The Boogie Board® writing tablet technology makes use of a unique feature of cholesteric liquid crystals (see U.S. Pat. No. 6,104,448) in which the liquid crystal material of a liquid crystal layer is suitably sandwiched between two very thin flexible substrates. The device is initially in a generally transmissive texture known as focal conic texture that allows the user to see the light absorbing background of the device. A light pressure on the writing surface changes the focal conic texture to a colored reflective texture known as a planar texture. The color of the planar texture is determined by the pitch length of the cholesteric liquid crystal. For example, writing on a device with a black light absorbing background and cholesteric liquid crystal pitch length tuned to green (550 nm) creates green writing contrasting with the black surroundings of the rest of the device. Erasing the written image is achieved by initializing the device to the generally transmissive focal conic texture applying voltage to transparent electrodes on the inner surface of the substrates in response to pushing a button on the writing tablet forming a clean page. Both the planar and focal conic textures are stable, which means that a voltage pulse is only required for erasing, but no voltage needs to be applied to maintain the image. The reflective, planar texture is only partially reflective with some light transmitted and the transmissive focal conic texture is weakly light scattering. The planar texture that forms the writing on the device when pressure is applied to the substrate remains, as do the focal conic surroundings, until a suitable erasing voltage pulse is applied to the electrodes.

Electronics in current writing tablets substantially add to the cost and limit the possible form factors of the devices as they need to accommodate electrically conductive layers, interconnections, batteries, and Printed Circuit Boards (PCBs). In one example of use of the writing tablet as a paper replacement, current technology is deficient in that unlike paper the writing tablets require electronics either to erase or to write. To be superior to paper, it is not only desirable to both write and erase without electronics but also to offer the feel and texture of a pen on paper with the capability of being reused thousands of times over and over again without the waste of paper.

SUMMARY OF THE DISCLOSURE

We disclose an electronic-free pressure sensitive liquid crystal device with write and erase capability closely mimicking paper but which can be reused many times over without electronics or ink. A liquid crystal layer includes cholesteric liquid crystal material and is disposed between a first or front substrate and a second or back substrate, both of which are flexible. A localized pressure on the first substrate, such as from the tip of a stylus or fingernail, creates a mark or writing on the device of a transmissive texture, which contrasts with the reflective texture that exists where pressure was not applied. The image includes marks formed of the transmissive texture, which allows light to pass through to be partially or almost entirely absorbed by a light absorbing background in back of the liquid crystal layer, and around the mark are surroundings including a reflective texture where pressure was not applied.

The image formed on the liquid crystal device includes marks formed of the transmissive texture, which allows light to pass through to be partially or almost entirely absorbed by a light absorbing background in back of the liquid crystal layer. The image also includes the surroundings where pressure was not applied, which include the reflective texture. As defined herein and used throughout this disclosure, the reflective texture is not completely reflective and the transmissive texture is not completely transmissive. The reflective texture permits some light to be transmitted through it and some light reflected. The transmissive texture is partially transmissive and weakly scattering of incident light. The reflective texture reflects substantially more light than light that is weakly scattered by the transmissive texture. One can see through the transmissive texture to the light absorbing background. Therefore, if the second or back substrate is black, the localized pressure creates a dark mark that contrasts with the color of the reflective texture of the rest of the device where pressure was not applied (the surroundings), color of the surroundings depending on the pitch length of the cholesteric liquid crystal. The dark mark includes the transmissive liquid crystal, enabling one to see, for example, the underlying black substrate through the liquid crystal layer. In one example, the surroundings may be referred to as bright and the mark may be referred to as dark, relative to one another. Of course, this does not require a high level of brightness of the surroundings or a high level of darkness of the mark, only that the mark contrasts with the surroundings. When using a color light absorbing background, both the mark and the surroundings may be seen as selected colors. The color light absorbing background does not need to be a uniform color and may include, for example, patterns, grids or display images for the light absorbing background or behind it.

The erasing of the image is simply achieved by flexing the device, transitioning the cholesteric liquid crystal in the flexed portions, including the previously written marks, to the reflective texture. When the liquid crystal device has been completely erased the cholesteric liquid crystal material across the entire writing surface or screen is in the reflective texture. This can be referred to as an initial texture of the liquid crystal device or as an initialized liquid crystal device. The flexing modes that can be used to erase the written image can be, for example, bending, rolling, twisting, flapping, shaking, crumpling, and any other approach providing flexing of the substrates.

The disclosed device is thus a reusable, thin, flexible, electronics-free, low cost writing film that does not require ink. In this regard, the disclosed device is even more convenient than paper because it does not require a pencil or ink to leave material on the surface to create the image. One can even write on it with a fingernail. It is also advantageously reusable and thus avoids the waste of paper. It also requires no voltage application, making it superior to complex electronic writing devices that employ electronics to write and/or erase images.

This disclosed technology can also be used in applications other than writing and drawing. One example is the implementation of the device as a decorative layer. The film can be adapted to work as a pressure sensitive film that changes color when touched with suitable pressure. The initial generally reflective texture has appealing iridescent properties that could make an interesting contrast with the colors and optical properties of the back substrates revealed through the transmissive texture formed after touching the film with a suitable pressure. Bending or flexing the film will refresh the device to the reflective texture.

In another embodiment the user is located proximal to the first or front substrate upon which pressure is applied, and the light absorbing background absorbs light passing through the liquid crystal layer. The light absorbing background and the second or back substrate are more distal to the user than the front substrate is to the user. One can flip the device over while the user remains in the same position and the user can also apply pressure to the second substrate in which case the user would be more proximal to the second substrate than to the first substrate. The word substrate is used as a generic term in this disclosure that includes not only the main material of the bulk of the films but also any coating or treatment on their surfaces.

Many other embodiments are possible with this new technology by itself and in combination with other innovative concepts. The properties of the writing devices and the commercial potential makes this a suitable low-cost reusable replacement of paper in many applications or a design element to be used for decorative purposes.

A first aspect of the disclosure features a liquid crystal device including a first substrate and a second substrate that are spaced apart from each other and both of which are flexible. The first substrate is transparent. The liquid crystal device includes a liquid crystal layer including cholesteric liquid crystal material. The liquid crystal layer is disposed between the first substrate and the second substrate. The cholesteric liquid crystal material is adapted to enable pressure applied by a user to the first substrate to change at least a portion of the cholesteric liquid crystal material from a reflective texture to a transmissive texture to form an image. The image is erased partially or entirely by flexing the liquid crystal device to place the cholesteric liquid crystal material in the reflective texture.

Referring now to specific features of the first aspect, the liquid crystal device includes a light absorbing background that absorbs light passing through the liquid crystal layer. In another specific feature the light absorbing background is comprised of a coating or layer on the second substrate. In yet another feature, the light absorbing background is opaque or semitransparent. Still further, the light absorbing background may include an opaque or semitransparent second substrate. Another feature is that the light absorbing background has a color.

Another feature is that the liquid crystal device includes no electrodes.

Another feature is that the cholesteric liquid crystal material comprises cholesteric liquid crystal dispersed in polymer.

Still another feature is that the liquid crystal device includes a second liquid crystal layer stacked over the liquid crystal layer. As another feature, the liquid crystal device may include at least one substrate disposed between the liquid crystal layer and the second liquid crystal layer. Yet another feature is that the second liquid crystal layer includes second cholesteric liquid crystal material; and the cholesteric liquid crystal material and the second cholesteric liquid crystal material have opposite chiral handedness. Another feature is that the second liquid crystal layer includes second cholesteric liquid crystal material; and the cholesteric liquid crystal material and the second cholesteric liquid crystal material have different pitch lengths.

Other features relate to erasing the liquid crystal device by flexing the device in various ways. In one feature the image is erased partially or entirely by flexing that occurs by rolling or scrolling the liquid crystal device. In another feature the image is erased partially or entirely by flexing that occurs by shaking or flapping the liquid crystal device. Another feature is that the image is erased partially or entirely by flexing that occurs by twisting the liquid crystal device. In another feature the image is erased partially or entirely by flexing that occurs by crumpling the liquid crystal device. Another feature is that the image is erased partially or entirely by flexing that occurs by removing the liquid crystal device from contact with an object.

In another feature the liquid crystal device includes a stamp or printing press that applies the pressure. Yet another feature is that the liquid crystal device includes a stylus that applies the pressure.

In another feature the first substrate and the second substrate are spaced apart by a distance ranging from about 2 microns to about 4 microns.

In yet another feature pressure applied by the user to the second substrate changes at least a portion of the cholesteric liquid crystal material from the reflective texture to the transmissive texture.

A second aspect of the disclosure is a liquid crystal device including a first substrate and a second substrate that are spaced apart from each other and both of which are flexible. The first substrate is transparent. The liquid crystal device includes a liquid crystal layer including cholesteric liquid crystal material. The liquid crystal layer is disposed between the first substrate and the second substrate. The liquid crystal device includes a light absorbing background that absorbs light passing through the liquid crystal layer. The cholesteric liquid crystal material is adapted to enable pressure applied by the user to the first substrate to form a mark that appears dark where pressure is applied, whereby surroundings appear bright where pressure is not applied. The mark is erased partially or entirely by flexing the liquid crystal device.

Referring to specific features of the second aspect, the liquid crystal device includes no electrodes.

Another feature is that the liquid crystal device includes a stylus for applying the pressure.

In another feature the first substrate and the second substrate are spaced apart by a distance ranging from about 2 microns to about 4 microns. Another feature is that the cholesteric liquid crystal material includes cholesteric liquid crystal dispersed in polymer.

In yet another feature pressure applied by the user to the second substrate changes at least a portion of the cholesteric liquid crystal material from the reflective texture to the transmissive texture.

Any of the specific features of the first aspect may apply as specific features of the second aspect in any combination.

It should be understood that the above Summary of the Disclosure describes embodiments of the disclosure in broad terms while the following Detailed Description describes embodiments of the disclosure more narrowly and presents specific embodiments that should not be construed as necessary limitations of the invention as broadly defined in the claims. Many additional features, advantages and a fuller understanding of the disclosure will be had from the accompanying drawings and the Detailed Description that follows.

BRIEF DESCRIPTION OF THE FIGURES

FIG. 1: Cross sectional views of the liquid crystal device of this disclosure illustrating the process of writing;

FIGS. 2 and 3: Front views of the liquid crystal device of FIG. 1 illustrating the process of writing;

FIG. 7A, 7B: Cross-sectional and front views of an embodiment of a liquid crystal device of this disclosure with stacked cholesteric liquid crystal material layers.

DETAILED DESCRIPTION

Figure 4:
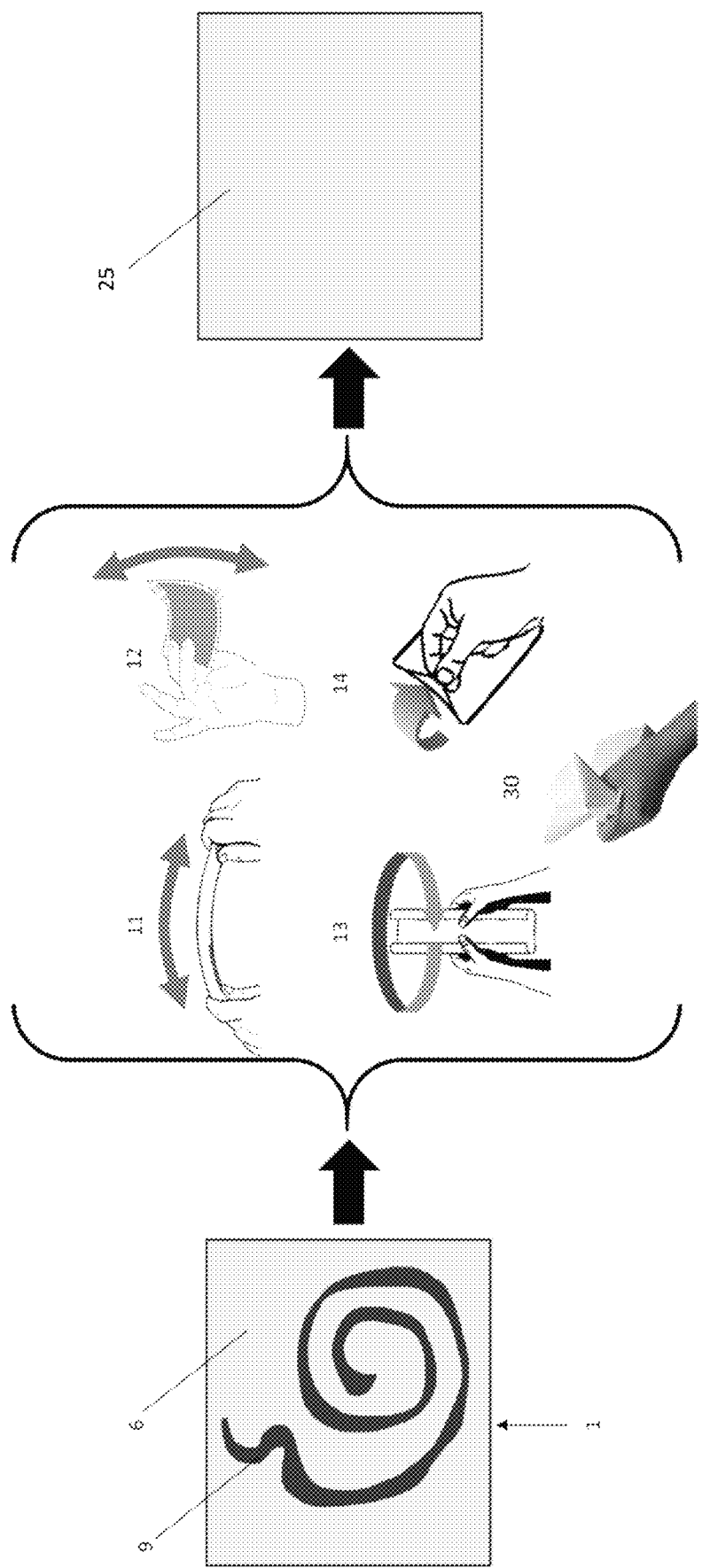
FIG. 4: Examples of different flexing modes applied to the entire liquid crystal device to erase the written image.

FIG. 1 depicts, not to scale, a cross-section of a liquid crystal device 1 that comprises a first or front substrate 3 and a second or back substrate 4 that are both flexible. The first substrate 3 and the second substrate 4 are spaced apart from each other. A liquid crystal layer 2 is disposed between the first substrate and the second substrate. The liquid crystal layer 2 includes cholesteric liquid crystal material. The front substrate 3 is transparent. The back substrate 4 can be transparent, or it can be, semitransparent, opaque, or multicolored to serve as a light absorbing background. An optional light absorbing background 5 absorbs light passing through the liquid crystal layer 2. The light absorbing background 5 can be coated or laminated on the back substrate 4. If the back substrate 4 is light absorbing then a separate light absorbing background 5 may be omitted. There is a cell gap or distance between the spaced apart substrates and spacers are disposed within the cell gap, the spacers having a size that approximates the cell gap. In particular, the cell gap is in a range of about 2 microns to about 4 microns in size, most specifically about 2 microns in size.

A person having ordinary skill in the art would realize in view of this disclosure that the liquid crystal device 1 is not limited by the presence or absence of a polymer or other material in the liquid crystal layer 2, by a material present or absent between the liquid crystal layer 2 and the substrates 3 or 4, or by the presence or absence of a material on outer surfaces of the first substrate 3 or the second substrate 4. No electrically conductive layers (electrodes) or drive electronics are needed in the liquid crystal device for applying a voltage to erase the device. Voltage is not used to write on or erase the liquid crystal device.

The writing surface of the liquid crystal device 1 in the embodiment shown in FIGS. 1-3 is on the front (first) substrate 3 where the first substrate is more proximal to the user than the back (second) substrate 4 is to the user. On the other hand, the liquid crystal device can be flipped over while the user remains in the same position and one can write on the second substrate 4 as the writing surface that is more proximal to the user than the first substrate 3 is to the user. In the flipped liquid crystal device 1 one might relocate the light absorbing layer to the other side of the liquid crystal layer 2 (i.e., more distal to the user than the liquid crystal layer is to the user) if writing on the second substrate 4. This could be by permanent design or temporary design as in the case of using a removable light absorbing background 5 that could, for example, be moved from one substrate to the other substrate.

The cholesteric liquid crystal material of the liquid crystal layer 2 is adapted to have an initial state that is generally in the reflective texture 25 (FIG. 2) so that in the front view the screen or writing surface of the liquid crystal device 1 (first substrate 3) appears entirely as a reflective color determined by the pitch of the cholesteric liquid crystal and affected by the reflection spectra of the layers 4 and 5 and any underlying layers or light emitting devices. The liquid crystal layer 2 is designed so that a local deformation caused by pressure applied by an external object 7 on the first substrate 3 (middle view of FIG. 1), deforms the first substrate 3, changing at least a portion of the cholesteric liquid crystal texture from the reflective texture 25 to a transmissive texture 8 in regions where the pressure was applied. A mark 9 is made comprising a region of the liquid crystal material in the transmissive texture 8. There are surroundings 6 where pressure was not applied, comprised of one or more regions of the reflective liquid crystal material 25, to form an image (FIG. 3). In this example, the surroundings 6 appear bright and the mark 9 appears dark, in contrast to each other. It is significant that this process does not need any voltage to be applied in order to create the image, making formation of the transmissive texture from the reflective texture a phenomenon that has not been used before in liquid crystal writing devices, to the knowledge of the inventors. The transmissive texture 8 of the liquid crystal layer created by the local deformation remains even after the deformation is completed, allowing more ambient light to go through the region of the deformation or a mark, than through the reflective texture where pressure was not applied (the surroundings 6). Light passing through the transmissive texture 8 is absorbed and/or reflected by the layers 4 and 5.

While not wanting to be bound by theory, polarizing microscope studies of the transmissive texture 8 indicate similarities to the classic focal conic texture but they are not necessarily identical. The light absorbing background 5 will absorb and/or reflect most light going through the region of the transmissive texture 8 of the liquid crystal layer where local pressure was applied. The undeformed areas of the display screen or writing surface (the surroundings 6) remain in the reflective texture 25 (appearing bright), reflecting some of the ambient light following the circular polarization properties of cholesteric liquid crystals in the planar texture. The result in a front view of the writing device is a visible mark 9 in contrast to the reflective surroundings 6. The mark 9 may be black or a color or shade thereof that contrasts with the planar texture of the surroundings 6.

For example, if the cholesteric liquid crystal pitch length is tuned to a green color with a transparent second substrate 4 and including an optional black light absorbing background 5, the resulting appearance of the device in front view will be a more or less black mark 9 (a dark mark) and green surroundings 6. The black light absorbing background 5 will absorb most light going through the region of the transmissive texture 8 of the liquid crystal layer 2. The region of the reflective texture 25 in the undepressed liquid crystal layer 2 forms the bright surroundings 6 around the mark 9.

More specifically, the liquid crystal writing device comprises a cholesteric liquid crystal material layer disposed between flexible substrates. The cholesteric liquid crystal in the liquid crystal layer can be initialized to a reflective texture by flexing or bending the device. The reflective texture is formed by some or all cholesteric liquid crystal domains with helix axis orientation distribution mostly perpendicular to the substrate's plane which allows selective light reflection following Bragg's law as is well known in the prior art of liquid crystal materials. This configuration is often referred to as a planar texture. A localized pressure made by a stylus or other object on the device surface changes the generally bright reflective texture to a transmissive texture, only in the regions where the localized pressure was applied. The transmissive texture allows light to partially transmit through and interact with the opposite layers of the device. This transmissive texture resembles a focal conic texture but may not be the same as that texture. In the focal conic texture the cholesteric liquid crystal of some or most of the domains' helix axes are distributed more in a random orientation allowing more light to transmit and scatter through the transitioned areas to be absorbed and/or reflected by a light absorbing background in back of the liquid crystal layer remote from the writing surface (see U.S. Pat. No. 6,104,448 incorporated by reference). Ambient light interacts differently with both the reflective and transmissive textures creating an image with good contrast. The image will remain permanently until the device is flexed for erase in sections or entirely. The bending will transform all affected areas of the device back to the reflective texture effectively erasing all or some marks created with the localized pressure without the need of electronics.

The object 7 can be a stylus, fingernail or any force creating entity that can cause a localized deformation of the front substrate 3. The object 7 can be a solid object, but as a force creating entity it can be localized pressure caused by liquid or gaseous jets.

The liquid crystal layer 2 can comprise cholesteric liquid crystal dispersed in polymer, with or without additives.

While not wanting to be bound by theory and understanding that an inventor need not explain the mechanism behind an invention, the effect of applying localized pressure to the first substrate 3 that changes the cholesteric liquid crystal from the reflective texture to a transmissive texture, is surprisingly opposite that of the prior art. It is to be noted that the effect can be made to occur using exactly the same cholesteric liquid crystal as disclosed in the prior art (see for example U.S. Pat. No. 8,228,301). The effect, however, can be made to occur by changing the polymer formulation (see Example 1). The effect occurs when the spacing between the first or front substrate 3 and second or back substrate 4 is between about 2 um to about 4 um. In some cases, increasing the surface energy of surfaces of the substrates that are nearest to the cholesteric liquid crystal material improves the effect. For example, variations in UV/Ozone substrate surface treatment can be made that increase the substrate surface energy. A person having ordinary skill in the art will be able to make modifications to the features in the example, without undue experimentation, to arrive at other cholesteric liquid crystal materials or devices which have the same properties described in this disclosure. For example, variations of the formulation of Example 1 may use different initiator, cross-linker, monomer, cholesteric liquid crystal compounds or nematic liquid crystal compounds, while remaining within the scope of this disclosure. For example, modifications intended to increase contrast or change line width may be made to the formulation of Example 1 while remaining within the scope of this disclosure. Different processing conditions such as curing irradiance and curing time can be used to obtain a device with the properties described in this disclosure. These compositional, structural and processing changes create a system that responds differently to different types of forces. A localized compressive force promotes the transmissive texture that creates contrast with the reflective surroundings. A shear force created by flexing the substrates induces the reflective texture reinitiating the device. While not wanting to be bound by theory, it is believed that the polymer morphology and/or the plasticizing effect of non-reactive materials may affect the rheological behavior of the liquid crystal so it flows differently depending on the force being applied allowing the liquid crystal molecules to rearrange into different textures when relaxing after flow is finished.

The liquid crystal layer is adapted so suitable mechanical flexing of the liquid crystal device will initialize the cholesteric liquid crystal material to the reflective texture 25 as well as erase a written image, enabling the liquid crystal device 1 to be reused. This provides an alternative way of erasing the liquid crystal device instead of applying voltage.

FIG. 4 shows different ways of flexing the liquid crystal device for erasing wherein the liquid crystal device is changed from having writing or marks 9 of the transmissive texture and the surroundings 6 around the mark 9 of the reflective texture (left side view), to the entire writing surface being in the reflective texture 25 as an initial state (right side view). In all examples of FIG. 4 one starts with the liquid crystal device having marks formed on it (left side view) and flexes the liquid crystal device in various ways (middle view) to erase the marks and form the reflective texture throughout the entire device (right side view). Full erase to the reflective texture employs ripples of flexural stress (shear) traveling across the flexible device. For example, one can flex the liquid crystal device 1 by holding it with both hands and bending it (bend to erase 11). In another example, the liquid crystal device 1 may be flexed by shaking the device until erasing is achieved (shake to erase 12). If the substrates are suitably thin, the liquid crystal device 1 can be rolled inwards and/or outwards flexing the entire device area permitting useful applications such as scrolls that erase the writing or drawing when rolled in and out (roll to erase 13). The liquid crystal device can be rolled and unrolled around a cylinder for flexing that causes it to be erased. The rolling can be mechanized or by hand. Flexing across the liquid crystal device area can also be achieved by peeling the flexible device from a surface on which it is in contact or adhered (peel to erase 14). There are many other examples of flexing of the substrates that can be used to achieve full erasing such as torsion and twisting, even crumpling 30.

The erasing sensitivity can also be tuned. This means that the erasing process could require from one to several cycles of the selected bending mode to be complete. Again, this depends on the application. For instance, a peel to erase application may utilize full erase that happens at the first attempt of removing the flexible device from the surface where it is attached. On the other hand, in other applications several bends or shakes may be needed to completely erase the liquid crystal device, which is desirable to prevent accidental erasing.

Figure 5:
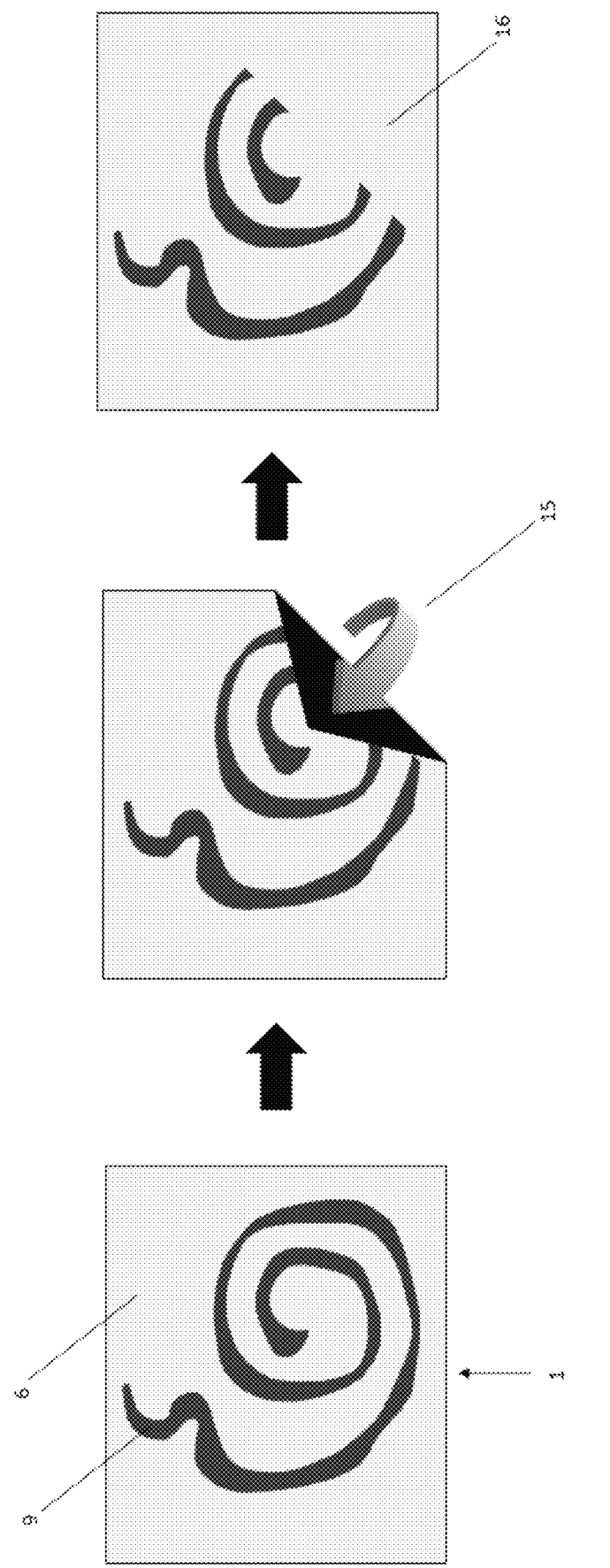
FIG. 5: Illustration of an image being partially erased by flexing only a portion of the liquid crystal device.

The liquid crystal device of this disclosure allows partial erasure of the transmissive mark by flexing only a portion of the device. FIG. 5 represents one example in which the image including the mark 9, and the reflective surroundings 6 around the mark 9, is partially erased by flexing only a portion of the device 1 changing the texture of the flexed area 15 into a partial erased area 16 formed of the reflective texture. The partially erased area 16 can be reused for writing or drawing by applying a localized pressure to this area, as explained in FIG. 1.

The liquid crystal device can be designed to have various degrees of flexibility, from drapable (very flexible) to less flexibility. Some ways of achieving this include adjusting the thickness of the substrates or the polymer material of the substrates.

The multilayer liquid crystal device 1 is flexible. Of course, this does not prevent the liquid crystal device from including inflexible elements so long as they do not prevent erasing by flexing the multilayer liquid crystal device. In one example, the back substrate could be a thicker element that enables less flexing of the multilayer liquid crystal device but still enough to enable the flexing to erase it. Sides of the liquid crystal device can be sealed in ways known to those having ordinary skill in the art including, but not limited to, sealing gaskets and laser singulation. For example, such sealing prevents delamination when the liquid crystal device is flexed to erase it. In another example, the liquid crystal device might include an inflexible frame or bezel but still enables flexing that erases it.

Figure 6:
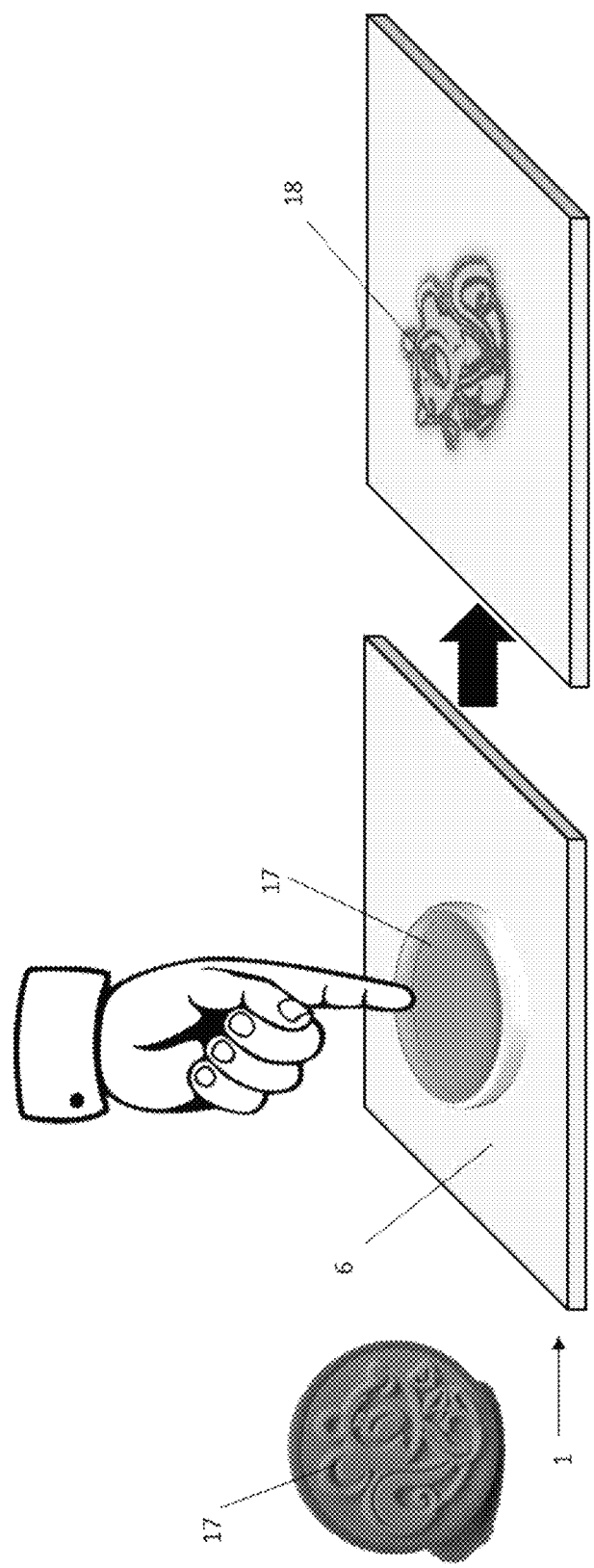
FIG. 6: Depiction of a process using a stamp to imprint an image on the liquid crystal device.

The embodiments explained in FIGS. 1-5 use as an example a moving object 7 such as a stylus 7 for applying pressure on the front substrate 3 to create marks when writing or drawing. The stylus is a pointed object without a need for ink, such as an elongated thin cylindrical object with a pointed tip that is optionally formed of polymer. However, an object with a relief can be used to create localized stationary pressure forming a lesser reflective image from pressing a stamp on the reflective background. FIG. 6 shows an example of this application. A stamping object 17 is positioned on the surface of the liquid crystal device 1 that is initially fully in the reflective texture (the reflective texture 25 being present throughout the writing surface). Upon exerting a force on the stamp 17, the protruded portions of the stamp create localized pressure on the device surface transforming the pressured areas into a transmissive texture making an image 18. When forming the stamped image different areas of the image can have lesser reflectivity than others (gray scale) depending on the extent of the protrusion and force applied to different areas. In a similar configuration, the stamp can be placed under the liquid crystal device 1 and uniform pressure applied on the surface of the device revealing the protruding shape of the stamp in a frottage printing like process. The erasing proceeds under the same principles explained in FIG. 4 and FIG. 5. A mechanical printing press using a platen having various protruding and recessed surfaces (e.g., mechanical pressing of the stamp 17 of FIG. 6) can be used to form letters or other images. Another force inducing entity may use jets of air, fluid or the like to form images on the liquid crystal device.

A stacked liquid crystal layer embodiment is depicted in FIGS. 7A and 7B. In this liquid crystal device, two or more layers of cholesteric liquid crystal material (first liquid crystal layer 19, second liquid crystal layer 20) can be stacked and share one common transparent middle substrate 21 that is flexible. Alternatively, the middle substrate 21 can be replaced by two optically coupled, flexible transparent or semitransparent substrates. The front or first substrate 3 serves as a flexible writing surface whereas the back or second substrate 4 and optional coating of the light absorbing background 5 function as light absorbing background depending on the reflective/absorptive characteristics of their combined effect. The second substrate 4 and the coating of the light absorbing background 5 are also flexible. The cholesteric liquid crystal materials of the first and second liquid crystal layers 19 and 20 are engineered so that a localized pressure exerted by a moving or stationary object 7 creates a local deformation on the front substrate 3 and on the middle substrate(s) 21 changing the reflective textures 27, 29 of both liquid crystal layers 19, 20 into regions of the transmissive textures 22, 23 where local pressure is applied. The regions of the transmissive textures 22, 23 might or might not be the same. The regions of transmissive textures 22, 23 are maintained without applying a voltage. The regions of reflective textures 27, 29 have reflective colors intrinsic to the cholesteric liquid crystal materials and dependent upon its pitch lengths, which is affected by any color of the layers 4 and light absorbing background 5 (e.g., as a coating) observed in a front view (FIG. 7B). The reflective textures 27, 29 are maintained in areas where pressure is not applied, without application of a voltage. A mark 24 contrasts with a bright mixing of regions of the reflective textures 27, 29 illustrated by surroundings 6 around the mark 24 in FIG. 7B. The reflective color of the reflective (e.g., planar) texture 27 in first liquid crystal layer 19 mixes with the reflective color of the reflective (e.g., planar) texture 29 in the second liquid crystal layer 20, and is also affected by color from layers, displays, patterns or the like, below the second liquid crystal layer 20 such as a colored light absorbing background 5 (e.g., as a coating). The reflecting textures 27, 29 are located in undepressed regions where pressure is not applied. Another example is that the light absorbing background is a semitransparent layer 5. The stacked multilayer liquid crystal device is flexible. Inflexible elements or components may be used in the stacked multilayer liquid crystal device so long as it may be flexed to erase it as described above in the case of the liquid crystal display device 1.

An advantage of this type of construction is that by combining the optical properties of multiple layers it is possible to achieve effects that are difficult or impossible with one layer. For instance, the first and second liquid crystal layers 19 and 20 could contain cholesteric liquid crystals with the same pitch length (same color) but with opposite chiral handedness, resulting in a total reflectance higher than 50% which is the theoretical limit of one single layer. The first and second liquid crystal layers 19 and 20 could have different colors that would additively mix to provide a color that could not be achieved by one layer alone. For example, a liquid crystal device including a blue first liquid crystal layer 19 and a yellow second liquid crystal layer 20, when in the reflective textures, undergoes additive mixing of these colors to provide a broader wavelength approaching the appearance of white surroundings 6, which is desired in certain applications. No electrically conductive layers need to be used for applying a voltage for erasing an image on the device.

Partial or full erase of the multilayer device proceeds by using a desired flexing mode as described above.

The disclosure will now describe particular embodiments in the Example, which should not be used to limit the subject matter as defined in the claims.

EXAMPLE

Mixture Ingredients and Preparation

A composition included the following components vortex mixed in an amber vial: 0.39% w/w Irgacure 819, 2.23% w/w methyl methacrylate, 4.60% w/w bisphenol A ethoxylate diacrylate, 6.16% w/w di(ethylene glycol) 2-ethylhexyl ether acrylate, 0.66 w/w % 2-hydroxyethyl methacrylate, all purchased from Sigma-Aldrich. Added to the vial were 18.82% w/w MDA-00-3506 nematic liquid crystal and 66.97% w/w MDA-00-1955 Cholesteric Liquid Crystal, both obtained from Merck, to the desired final amount. Mechanical stirring was used until a clear solution was obtained. 0.2% w/w 2 um plastic spacers purchased from Nanomicro were added to the mixture and dispersed by ultrasound. The components were added based on the total weight of the composition.

Flex to Erase Liquid Crystal Device Fabrication

Two 2 mil optically clear polyethylene terephthalate (PET) films were treated using UV/Ozone. Mixture A was then sandwiched between these two substrates applying uniform pressure. The lamination conditions were set so that a cell gap of approximately 2 um was achieved. A UV lamp was used to cure the reactive mixture through the front substrate. After curing, the back substrate on the opposite side of the curing was coated with black ink.

Flex to Erase Liquid Crystal Device Operation

The resulting liquid crystal device that was flexible was bent to initialize the device into a reflective texture. Applying direct pressure with an object on the clear PET side formed a transmissive texture in which the reflectance was reduced in the deformed area increasing light transmission through the cholesteric liquid crystal material layer. The black ink layer absorbed the light passing through creating contrast with the reflective surroundings of the non-deformed area. To erase the image created, flexing in the form of bending or shaking was performed until the entire device returned to the original reflective background. After being flexed to erase, pressure was applied to the front substrate to write on the liquid crystal device forming marks of the transmissive texture and having surroundings in the reflective texture where pressure was not applied.

Many modifications and variations will be apparent to those of ordinary skill in the art in light of the foregoing disclosure. Therefore, it is to be understood that, within the scope of the appended claims, the invention can be practiced otherwise than has been specifically shown and described.

What is claimed is:

1. A liquid crystal device comprising:
a first substrate and a second substrate that are spaced apart from each other and both of which are flexible, wherein said first substrate is transparent;
a liquid crystal layer including cholesteric liquid crystal material and being disposed between said first substrate and said second substrate;
wherein said cholesteric liquid crystal material is adapted to enable pressure applied by a user to said first substrate to change at least a portion of said cholesteric liquid crystal material from a reflective texture to a transmissive texture to form an image;
wherein said image is erased partially or entirely by flexing said liquid crystal device to place said cholesteric liquid crystal material in said reflective texture, with the proviso that said liquid crystal device includes no electrodes.

2. The liquid crystal device of claim 1 wherein said cholesteric liquid crystal material comprises cholesteric liquid crystal dispersed in polymer.

3. The liquid crystal device of claim 1 comprising a light absorbing background that absorbs light passing through said liquid crystal layer.

4. The liquid crystal device of claim 3 wherein said light absorbing background is comprised of a coating or layer upon said second substrate.

5. The liquid crystal device of claim 3 wherein said light absorbing background is opaque or semitransparent.

6. The liquid crystal device of claim 3 wherein said light absorbing background is comprised of an opaque or semi-transparent said second substrate.

7. The liquid crystal device of claim 3 wherein said light absorbing background has a color.

8. The liquid crystal device of claim 1 comprising a second liquid crystal layer stacked over said liquid crystal layer.

9. The liquid crystal device of claim 8 comprising at least one substrate disposed between said liquid crystal layer and said second liquid crystal layer.

10. The liquid crystal device of claim 8 wherein said second liquid crystal layer includes second cholesteric liquid crystal material, and said cholesteric liquid crystal material and said second cholesteric liquid crystal material have opposite chiral handedness.

11. The liquid crystal device of claim 8 wherein said second liquid crystal layer includes second cholesteric liquid crystal material, and said cholesteric liquid crystal material and said second cholesteric liquid crystal material have different pitch lengths.

12. The liquid crystal device of claim 1 wherein said image is erased partially or entirely by flexing that occurs by rolling or scrolling said liquid crystal device.

13. The liquid crystal device of claim 1 wherein said image is erased partially or entirely by flexing that occurs by shaking or flapping said liquid crystal device.

14. The liquid crystal device of claim 1 wherein said image is erased partially or entirely by flexing that occurs by twisting said liquid crystal device.

15. The liquid crystal device of claim 1 wherein said image is erased partially or entirely by flexing that occurs by crumpling said liquid crystal device.

16. The liquid crystal device of claim 1 wherein said image is erased partially or entirely by flexing that occurs by removing said liquid crystal device from attachment to an object.

17. The liquid crystal device of claim 1 comprising a stylus that applies said pressure.

18. The liquid crystal device of claim 1 wherein said first substrate and said second substrate are spaced apart by a distance ranging from about 2 microns to about 4 microns.

19. The liquid crystal device of claim 18 wherein said cholesteric liquid crystal material includes cholesteric liquid crystal dispersed in polymer.

20. The liquid crystal device of claim 1 wherein pressure applied by the user to said second substrate changes at least a portion of said cholesteric liquid crystal material from said reflective texture to said transmissive texture.

21. A liquid crystal device comprising:
a first substrate and a second substrate that are spaced apart from each other and both of which are flexible, wherein said first substrate is transparent;

a liquid crystal layer including cholesteric liquid crystal material and being disposed between said first substrate and said second substrate;

wherein said cholesteric liquid crystal material is adapted to enable pressure applied by a user to said first substrate to change at least a portion of said cholesteric liquid crystal material from a reflective texture to a transmissive texture to form an image;

wherein said image is erased partially or entirely by flexing said liquid crystal device to place said cholesteric liquid crystal material in said reflective texture, wherein said image is erased partially by flexing only a portion of said liquid crystal device.

22. A liquid crystal device comprising:

a first substrate and a second substrate that are spaced apart from each other and both of which are flexible, wherein said first substrate is transparent;

a liquid crystal layer including cholesteric liquid crystal material and being disposed between said first substrate and said second substrate;

wherein said cholesteric liquid crystal material is adapted to enable pressure applied by a user to said first substrate to change at least a portion of said cholesteric liquid crystal material from a reflective texture to a transmissive texture to form an image;

wherein said image is erased partially or entirely by flexing said liquid crystal device to place said cholesteric liquid crystal material in said reflective texture, and a stamp or printing press that applies said pressure.

23. A liquid crystal device comprising:

a first substrate and a second substrate that are spaced apart from each other and both of which are flexible, wherein said first substrate is transparent;

a liquid crystal layer including cholesteric liquid crystal material and being disposed between said first substrate and said second substrate;

a light absorbing background that absorbs light passing through said liquid crystal layer;

wherein said cholesteric liquid crystal material is adapted to enable pressure applied by the user to said first substrate to form a mark that appears dark where pressure is applied, whereby surroundings appear bright where pressure is not applied;

wherein said mark is erased partially or entirely by flexing said liquid crystal device, with the proviso that said liquid crystal device includes no electrodes.

24. The liquid crystal device of claim 23 comprising a stylus for applying said pressure.

25. The liquid crystal device of claim 23 wherein said first substrate and said second substrate are spaced apart by a distance ranging from about 2 microns to about 4 microns.

26. The liquid crystal device of claim 25 wherein said cholesteric liquid crystal material includes cholesteric liquid crystal dispersed in polymer.

27. The liquid crystal device of claim 23 wherein pressure applied by the user to said second substrate changes at least a portion of said cholesteric liquid crystal material from said reflective texture to said transmissive texture.

28. A liquid crystal device comprising:

a first substrate and a second substrate that are spaced apart from each other and both of which are flexible, wherein said first substrate is transparent;

a liquid crystal layer including cholesteric liquid crystal material and being disposed between said first substrate and said second substrate;

wherein said cholesteric liquid crystal material is adapted to enable pressure applied by a user to said first substrate to change at least a portion of said cholesteric liquid crystal material from a reflective texture to a transmissive texture to form an image, the image being able to be formed by applying the pressure with a fingernail and without application of voltage;

wherein said image is erased partially or entirely by flexing said liquid crystal device to place said cholesteric liquid crystal material in said reflective texture.

29. A liquid crystal device comprising:

a first substrate and a second substrate that are spaced apart from each other and both of which are flexible, wherein said first substrate is transparent;

a liquid crystal layer including cholesteric liquid crystal material and being disposed between said first substrate and said second substrate;

a light absorbing background that absorbs light passing through said liquid crystal layer;

wherein said cholesteric liquid crystal material is adapted to enable pressure applied by the user to said first substrate to form a mark that appears dark where pressure is applied, whereby surroundings appear bright where pressure is not applied;

wherein said mark is erased partially or entirely by flexing said liquid crystal device; and wherein said image is erased partially by flexing only a portion of said liquid crystal device.

30. A liquid crystal device comprising:

a first substrate and a second substrate that are spaced apart from each other and both of which are flexible, wherein said first substrate is transparent;

a liquid crystal layer including cholesteric liquid crystal material and being disposed between said first substrate and said second substrate;

a light absorbing background that absorbs light passing through said liquid crystal layer;

wherein said cholesteric liquid crystal material is adapted to enable pressure applied by the user to said first substrate to form a mark that appears dark where pressure is applied, whereby surroundings appear bright where pressure is not applied;

wherein said mark is erased partially or entirely by flexing said liquid crystal device; and a stamp or printing press that applies said pressure.

* * * * *